United States Patent
Bandai et al.

(10) Patent No.: US 7,702,432 B2
(45) Date of Patent: Apr. 20, 2010

(54) ELECTRIC POWERED VEHICLE PERFORMING REGENERATIVE BRAKING

(75) Inventors: Hiroyuki Bandai, Toyota (JP); Tomonari Taguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 277 days.

(21) Appl. No.: 12/005,335

(22) Filed: Dec. 27, 2007

(65) Prior Publication Data

US 2008/0255716 A1 Oct. 16, 2008

(30) Foreign Application Priority Data

Dec. 29, 2006 (JP) ............................. 2006-356816

(51) Int. Cl.
*B60L 9/00* (2006.01)
*B60L 11/00* (2006.01)

(52) U.S. Cl. ............................. 701/22; 701/2; 180/65.1; 180/65.21; 318/139

(58) Field of Classification Search ............. 701/22, 701/19, 55, 2; 180/65.1, 65.21; 318/139
See application file for complete search history.

(56) References Cited

U.S. PATENT DOCUMENTS

| 6,033,041 | A |  | 3/2000 | Koga et al. |
| 6,205,374 | B1 | * | 3/2001 | Kljima et al. ................... 701/1 |
| 6,205,379 | B1 | * | 3/2001 | Morisawa et al. ............. 701/22 |
| 6,209,672 | B1 | * | 4/2001 | Severinsky ............... 180/65.23 |
| 6,231,134 | B1 | * | 5/2001 | Fukasawa et al. ............ 303/152 |
| 6,338,391 | B1 | * | 1/2002 | Severinsky et al. ........ 180/65.23 |
| 6,554,088 | B2 | * | 4/2003 | Severinsky et al. ........ 180/65.23 |
| 6,615,118 | B2 | * | 9/2003 | Kumar ......................... 701/19 |
| 6,636,788 | B2 |  | 10/2003 | Tamagawa et al. |

(Continued)

FOREIGN PATENT DOCUMENTS

JP  9-250546  *  9/1997

(Continued)

OTHER PUBLICATIONS

Fuzzy controller design for parallel hybrid vehicle analysis using forward simulation; Naderi, P.; Mirsalim, M.; Bathaee, M.T.; Chini, R.; Vehicle Power and Propulsion Conference, 2009. VPPC '09. IEEE; Sep. 7-10, 2009 pp. 234 -241 Digital Object Identifier 10.1109/VPPC.2009.5289847.*

(Continued)

*Primary Examiner*—Cuong H Nguyen
(74) *Attorney, Agent, or Firm*—Oliff & Berridge, PLC (57) ABSTRACT

A regeneration control portion sets a torque command value (in general, a negative value) of a motor generator at a time of regenerative braking. A braking cooperative control portion calculates a total braking force (power) required for the entire vehicle based on a brake depression force BK of a driver and also controls the shares of the output of the total braking force between a hydraulic brake and the motor generator. An MG-ECU drives and controls the motor generator so that a regenerative torque is generated according to a torque command value. The regeneration control portion puts a limitation such that the absolute value of the regenerative torque is smaller at a time of downhill travel than at a time of flat-road travel, for the same brake operation.

3 Claims, 6 Drawing Sheets

U.S. PATENT DOCUMENTS

| | | | |
|---|---|---|---|
| 7,099,757 B2* | 8/2006 | Niki et al. ..................... | 701/22 |
| 7,237,634 B2* | 7/2007 | Severinsky et al. ....... | 180/65.23 |
| 7,383,115 B2* | 6/2008 | Tabata et al. ................. | 701/96 |
| 7,392,871 B2* | 7/2008 | Severinsky et al. ....... | 180/65.28 |
| 7,455,134 B2* | 11/2008 | Severinsky et al. ....... | 180/65.28 |
| 7,520,353 B2* | 4/2009 | Severinsky et al. ....... | 180/65.28 |
| 7,559,388 B2* | 7/2009 | Severinsky et al. ....... | 180/65.28 |
| 7,597,164 B2* | 10/2009 | Severinsky et al. ....... | 180/65.27 |
| 2001/0039230 A1* | 11/2001 | Severinsky et al. ............. | 477/3 |
| 2003/0217876 A1* | 11/2003 | Severinsky et al. ......... | 180/65.2 |
| 2005/0000479 A1* | 1/2005 | Niki et al. ................ | 123/90.15 |
| 2005/0189894 A1 | 9/2005 | Komiyama et al. | |
| 2006/0100057 A1* | 5/2006 | Severinsky et al. ............. | 477/4 |
| 2006/0231304 A1* | 10/2006 | Severinsky et al. ......... | 180/65.2 |
| 2006/0231305 A1* | 10/2006 | Severinsky et al. ......... | 180/65.2 |
| 2006/0231306 A1* | 10/2006 | Severinsky et al. ......... | 180/65.2 |
| 2006/0237246 A1* | 10/2006 | Severinsky et al. ......... | 180/65.2 |
| 2006/0237247 A1* | 10/2006 | Severinsky et al. ......... | 180/65.4 |
| 2007/0112494 A1* | 5/2007 | Naik et al. .................... | 701/55 |

FOREIGN PATENT DOCUMENTS

| | | |
|---|---|---|
| JP | A 2000-32602 | 1/2000 |
| JP | A-2001-112101 | 4/2001 |
| JP | A 2002-262411 | 9/2002 |
| JP | A 2002-369578 | 12/2002 |
| JP | 2003-192315 * | 7/2003 |
| JP | 2003-403211 * | 12/2003 |
| JP | A-2005-253126 | 9/2005 |
| JP | A 2005-263061 | 9/2005 |
| JP | A-2006-217677 | 8/2006 |
| WO | WO 97/10966 A1 | 3/1997 |

OTHER PUBLICATIONS

Verification of the optimum hybridization factor as design parameter of hybrid electric vehicles; Buecherl, D.; Bolvashenkov, I.; Herzog, H.-G.; Vehicle Power and Propulsion Conference, 2009. VPPC '09. IEEE; Sep. 7-10, 2009 pp. 847-851 Digital Object Identifier 10.1109/VPPC.2009.5289758.*

Stored energy transmission for road vehicles; Beale, J.R.A.; Electronics and Power; vol. 25, Issue 5, May 1979 pp. 323-328; Digital Object Identifier 10.1049/ep.1979.0206.*

Predicting the pullout torque/speed curve of variable-reluctance stepping motors; Acarnley, P.P.; Hughes, A.; Electric Power Applications, IEE Proceedings B; vol. 128, Issue 2, Mar. 1981 pp. 109-113; Digital Object Identifier 10.1049/ip-b:19810015.*

Design and Analysis of Fuel-Cell Hybrid Systems Oriented to Automotive Applications; Feroldi, D.; Serra, M.; Riera, J.; Vehicular Technology, IEEE Transactions on; vol. 58, Issue 9, Nov. 2009 pp. 4720-4729; Digital Object Identifier 10.1109/TVT.2009.2027241.*

Active Damping Wheel-Torque Control System to Reduce Driveline Oscillations in a Power-Split Hybrid Electric Vehicle; Syed, F. U.; Kuang, M. L.; Ying, H.; Vehicular Technology, IEEE Transactions on; vol. 58, Issue 9, Nov. 2009 pp. 4769-4785; Digital Object Identifier 10.1109/TVT.2009.2025953.*

Fuzzy-Logic-Based Sliding-Mode Controller Design for Position-Sensorless Electric Vehicle; Jian-Bo Cao; Bing-Gang Cao; Power Electronics, IEEE Transactions on; vol. 24, Issue 10, Oct. 2009 pp. 2368-2378; Digital Object Identifier 10.1109/TPEL.2009.2020429.*

Development of a Compact Switched-Reluctance Motor Drive for EV Propulsion With Voltage-Boosting and PFC Charging Capabilities; Hung-Chun Chang; Chang-Ming Liaw; Vehicular Technology, IEEE Transactions on; vol. 58, Issue 7, Sep. 2009 pp. 3198-3215; Digital Object Identifier 10.1109/TVT.2009.2017546.*

* cited by examiner

FIG.4A  AT HIGH-SPEED

FIG.4B  AT MID/LOW SPEED (ENGINE DRIVEN)

FIG.4C  AT MID/LOW SPEED (ENGINE STOP)

FIG.4D  AT EXTREMELY LOW SPEED

ELECTRIC POWERED VEHICLE PERFORMING REGENERATIVE BRAKING

This nonprovisional application is based on Japanese Patent Application No. 2006-356816 filed with the Japan Patent Office on Dec. 29, 2006, the entire contents of which are hereby incorporated by reference.

BACKGROUND OF THE INVENTION

1. Field of the Invention

The present invention relates to an electric powered vehicle, and more particularly to an electric powered vehicle equipped with a motor generator performing generation of a vehicle driving force and regenerative power generation at a time of regenerative braking.

2. Description of the Background Art

Hybrid vehicles have recently received attention as environmentally-friendly automobiles. A hybrid vehicle is an automobile that can generate a vehicle traveling power using an electric motor for driving the vehicle in addition to the conventional engine. In particular, in order to recover energy by regenerative power generation at a time of regenerative braking of the vehicle, a motor generator having both the functions of an electric motor and an electric generator is generally employed as an electric motor for the vehicle.

As for regenerative control of electric powered vehicles, Japanese Patent Laying-Open No. 2002-262411 (Patent Document 1) discloses a configuration of a speed control device for an electric powered vehicle such as an electrically operated golf car for avoiding the likelihood of skids. As the slope angle is larger in downhill traveling, the braking force of regenerative braking is increased, and the proportion applied to the drive wheels of the entire braking force including an electrical braking force and a mechanical braking force is increased, so that the drive wheel is locked, causing a skid. Specifically, the speed control device of the electric powered vehicle disclosed in Patent Document 1 is intended to improve traveling stability by limiting the wheel braking force by regenerative braking of the main motor when the gradient of a road is larger than a preset threshold value, thereby preventing a skid of the wheel due to locking.

Furthermore, International Publication WO97/10966 (Patent Document 2) also discloses a regenerative braking control device of an electric vehicle configured such that a regenerative braking force of an electric motor is controlled according to a gradient state, in order to avoid a wheel lock at a time of downhill travel and maintain vehicle traveling stability. In particular, Patent Document 2 discloses that a wheel lock is avoided by keeping the regenerative braking force on a down slope at the similar state as on a flat road, and thus traveling stability can be kept.

In addition, Japanese Patent Laying-Open No. 2000-32602 (Patent Document 3), Japanese Patent Laying-Open No. 2002-369578 (Patent Document 4), and Japanese Patent Laying-Open No. 2005-263061 (Patent Document 5) disclose a control configuration to limit regenerative power generation at a time of a temperature increase of an electric motor, in an electric powered vehicle such as an electric vehicle or a hybrid vehicle.

In electric powered vehicles, generally, regenerative power generation is performed by a motor generator in response to a brake operation by a driver to generate a regenerative braking force. However, not only power running of generating a vehicle driving force but also regenerative power generation at a time of regeneration causes the temperature of the motor generator (also referred to as a motor temperature hereinafter)

to be increased by heat generated mainly in a coil winding. When the motor temperature rises, it becomes necessary to limit the current amount, that is, the output torque, so that the vehicle driving force that can be generated by the motor generator is limited.

Therefore, even with the regeneration limitation as disclosed in Patent Documents 1, 2, when a downhill with a relatively gentle gradient continues, the motor temperature is increased by the continuous regenerative power generation, and the output (power running) torque of the motor generator is limited at a time of uphill travel or flat-road travel after downhill travel, so that the motive power performance may not be fully exerted. This problem is expected, in particular, in a travel pattern in which downhill travel and uphill travel are alternately performed, as in a mountain road.

Furthermore, in the control configuration that limits the regenerative power generation at a time of temperature increase of an electric motor (motor generator) that generates a vehicle driving force, as disclosed in Patent Documents 3-5, an excessive increase of the motor temperature can be prevented. However, this configuration is not enough as regeneration control that can cope with aforementioned problem and can secure a vehicle driving force sufficient for flat-road travel or uphill travel after downhill travel.

If the aforementioned problem is addressed in view of specification design, the size of the motor generator is increased, for the increased thermal capacity and the enforced cooling structure are required to suppress a temperature increase of the motor generator. In addition, in order to secure traveling performance at a time of temperature increase, torque has to be secured by shifting to low gear for the entire vehicle, leading to a poor fuel efficiency at a time of high-speed travel.

SUMMARY OF THE INVENTION

An object of the present invention is to perform regenerative power generation control of a motor generator at a time of downhill travel of an electric powered vehicle, with consideration for achieving sufficient motive power performance in flat-road travel or uphill travel following downhill travel.

An electric powered vehicle in accordance with the present invention includes a motor generator, a power conversion unit, a gradient sensing portion sensing a gradient of a road, and a regeneration control portion configured to generate a torque command value of the motor generator in a regenerative braking operation, at least according to a brake operation by a driver. The motor generator is configured to be able to receive/transmit a rotational force from/to a wheel. The power conversion unit is configured to perform bidirectional electric power conversion between a chargeable power supply and the motor generator so that the motor generator outputs a torque according to a torque command value. For the torque command value in the regenerative braking operation at a time of downhill travel and at a time of flat-road travel corresponding to the same brake operation, the regeneration control portion continuously puts a limitation such that an absolute value of the torque command value is smaller at a time of the downhill travel than at a time of the flat-road travel, based on a road gradient sensed by the gradient sensing portion.

According to the above-noted electric powered vehicle, heat generation in the motor generator can be suppressed by limiting regenerative power generation at a time of downhill travel as compared with at a time of flat-road travel. As a result, the output torque of the motor generator in flat-road travel or uphill travel after the end of downhill travel is secured thereby achieving sufficient motive power performance. In particular, it is possible to avoid a large temperature increase followed by the regenerative power generation at a time of downhill travel in which the requested braking force by a brake operation of a driver is increased, so that the size of the motor generator can be reduced because of the simplified cooling structure of the motor generator, or the fuel efficiency at a time of high-speed travel can be improved by shifting to high gear while avoiding shifting to low gear for the entire vehicle for ensuring the traveling performance at a time of temperature increase. Thus, the specification design related to the motor generator can be made efficient.

Preferably, the regeneration control portion includes a braking cooperative control portion and a regenerative torque setting portion. The braking cooperative control portion calculates a requested braking power in the entire vehicle according to a state of the electric powered vehicle and the brake operation and also sets a regenerative braking power shared by the motor generator, of the requested braking power. The regenerative torque setting portion generates the torque command value in the regenerative braking operation according to the regenerative braking power set by the braking cooperative control portion. Then, the braking cooperative control portion limits the regenerative braking power set corresponding to the same brake operation to be lower at a time of the downhill travel than at a time of the flat-road travel, based on the road gradient.

Further preferably, the regeneration control portion further includes a charging control portion setting requested charging power of the power supply according to a charge state of the power supply. The braking cooperative control portion sets the regenerative braking power within a range of the requested charging power or lower. Then, the charging control portion limits the requested charging power set corresponding to the same charge state to be lower at a time of the downhill travel than at a time of the flat-road travel, based on the road gradient.

According to such a configuration, a temperature increase of the motor generator at a time of downhill travel can be suppressed by the braking cooperative control at a time of downhill travel and the adjustment of the requested charging power.

Preferably, the electric powered vehicle further includes a temperature obtaining portion obtaining a temperature of the motor generator. Then, the regeneration control portion sets a limitation degree of the torque command value in the regenerative braking operation at a time of the downhill travel with respect to at a time of the flat-road travel, according to the temperature of the motor generator.

Preferably, the regeneration control portion sets a limitation degree of the torque command value in the regenerative braking operation at a time of the downhill travel with respect to at a time of the flat-road travel, according to the road gradient. Alternatively, preferably, the regeneration control portion sets a limitation degree of the torque command value in the regenerative braking operation at a time of the downhill travel with respect to at a time of the flat-road travel, according to the brake operation.

According to such a configuration, the regenerative power generation by the motor generator can be limited by a proper degree, corresponding to the temperature state of the motor generator, the gradient of a road, or the brake operation of the driver. As a result, while energy is recovered by regenerative power generation within a possible extent, a temperature increase of the motor generator can be prevented.

Preferably, in the electric powered vehicle according to the present invention, the regeneration control portion sets the torque command value of the motor generator to approximately zero, at a time of the downhill travel.

According to such a configuration, regenerative power generation by the motor generator is stopped at a time of downhill travel, so that a temperature increase of the motor generator can be prevented reliably.

An electric powered vehicle in accordance with another aspect of the present invention includes a motor generator, a power conversion unit, a gradient sensing portion sensing a gradient of a road, a temperature obtaining portion obtaining a temperature of the motor generator, and a regeneration control portion configured to generate a torque command value of the motor generator in a regenerative braking operation, at least according to a brake operation by a driver. The motor generator is configured to be able to receive/transmit a rotational force from/to a wheel. The power conversion unit is configured to perform bidirectional electric power conversion between a chargeable power supply and the motor generator so that the motor generator outputs a torque according to a torque command value. Then, for the torque command value in the regenerative braking operation at a time of downhill travel and at a time of flat-road travel corresponding to the same brake operation, the regeneration control portion puts a limitation such that an absolute value of the torque command value is smaller at a time of the downhill travel than at a time of the flat-road travel, based on a road gradient sensed by the gradient sensing portion, according to a limitation degree corresponding to the temperature of the motor generator and the road gradient.

According to the above-noted electric powered vehicle, the regenerative power generation at a time of downhill travel can be limited by a proper degree in accordance with the limitation degree corresponding to the temperature of the motor generator and the gradient of a road. Therefore, while energy is recovered by regenerative power generation within a possible extent, a temperature increase of the motor generator can be prevented at a time of downhill travel.

Therefore, the main advantage of the present invention is in that regenerative power generation control of a motor generator can be performed at a time of downhill travel of an electric powered vehicle, with consideration for achieving sufficient motive power performance in flat-road travel or uphill travel following downhill travel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the figures. It is noted that in the following, the same or corresponding parts will be denoted with the same reference characters and description thereof will not basically be repeated.

Figure 1:
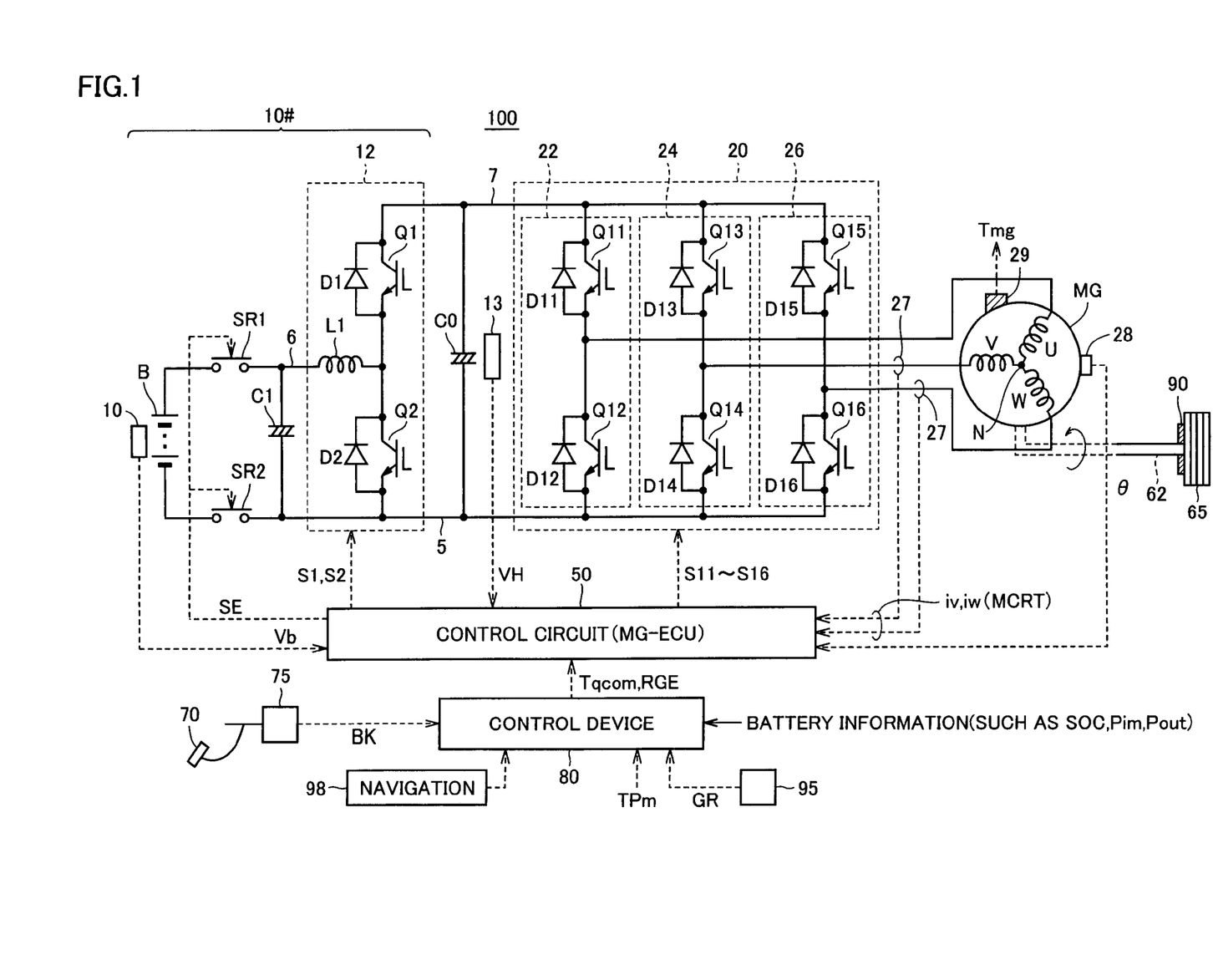
FIG. 1 is a schematic configuration diagram related to an electric motor for driving a vehicle of an electric powered vehicle in accordance with an embodiment of the present invention.

Referring to FIG. 1, an electric powered vehicle 100 in accordance with an embodiment of the present invention includes a DC voltage generation portion 10#, a smoothing capacitor C0, an inverter 20, a control circuit 50 and a control device 80 typically formed of an ECU (Electronic Control Unit), a motor generator MG, a driving shaft 62, and a wheel 65 rotatably driven with rotation of driving shaft 62. Driving shaft 62 is configured to be able to receive/transmit a rotational force from/to the output shaft of motor generator MG, generally, through a transmission mechanism such as a not-shown speed reducer. In addition, wheel 65 is provided with a braking mechanism, typically, a hydraulic brake 90 mechanically applying a braking force by hydraulic pressure supply. Such a braking mechanism is generally provided for each wheel.

Motor generator MG is mounted on an electric powered vehicle such as a hybrid vehicle or an electric vehicle to generate driving torque for wheels at a time of power running and to generate regenerative torque in the opposite direction to the rotational direction of drive wheels 65 at a time of regeneration thereby performing regenerative power generation by generation of an electrical braking force (regenerative braking force). In other words, motor generator MG is configured as a "motor generator" for vehicle driving, including both functions of an electric motor and an electric generator. In a hybrid vehicle, another motor generator may be further provided which is configured to have a function of an electric generator driven by an engine. It is noted that in a case where electric powered vehicle 100 is a hybrid vehicle, a vehicle driving system is configured such that driving shaft 62 can also be rotated by an output of an engine (not shown).

DC voltage generation portion 10# includes a DC power supply B, system relays SR1, SR2, a smoothing capacitor C1, and a step-up/down converter 12. As DC power supply B, a secondary battery such as a nickel metal hydride or lithium ion battery, or an electricity storage device such as an electric double layer capacitor can be applied. DC voltage Vb output by DC power supply B is sensed by a voltage sensor 10. Voltage sensor 10 outputs the detected DC voltage Vb to control circuit 50.

System relay SR1 is connected between the positive electrode terminal of DC power supply B and a power supply line 6, and system relay SR2 is connected between the negative electrode terminal of DC power supply B and a ground line 5. System relays SR1, SR2 are turned on/off by a signal SE from control circuit 50. More specifically, system relays SR1, SR2 are turned on by signal SE at H (logic high) level from control circuit 50 and turned off by signal SE at L (logic low) level from control circuit 50. Smoothing capacitor C1 is connected between power supply line 6 and ground line 5.

Step-up/down converter 12 includes a reactor L1 and power semiconductor switching elements Q1, Q2. Power semiconductor switching elements Q1 and Q2 are connected in series between a power supply line 7 and ground line 5. The on/off of power semiconductor switching elements Q1 and Q2 is controlled by switching control signals S1 and S2 from control circuit 50.

In the embodiment of the present invention, an IGBT (Insulated Gate Bipolar Transistor), a power MOS (Metal Oxide Semiconductor) transistor, a power bipolar transistor, or the like may be used as the power semiconductor switching element (simply referred to as "switching element" hereinafter). Anti-parallel diodes D1, D2 are arranged for switching elements Q1, Q2.

Reactor L1 is connected between the connection node of switching elements Q1 and Q2 and power supply line 6. In addition, smoothing capacitor C0 is connected between power supply line 7 and ground line 5.

Inverter 20 includes a U-phase arm 22, a V-phase arm 24 and a W-phase arm 26 provided in parallel between power supply line 7 and ground line 5. Each phase arm is formed of switching elements connected in series between power supply line 7 and ground line 5. For example, U-phase arm 22 is formed of switching elements Q11, Q12, V-phase arm 24 is formed of switching elements Q13, Q14, and W-phase arm 26 is formed of switching elements Q15, Q16. Anti-parallel diodes D11-D16 are respectively connected to switching elements Q11-Q16. The on/off of switching elements Q11-Q16 is controlled by switching control signals S11-S16 from control circuit 50.

The intermediate point of each phase arm is connected to each phase end of each phase coil of motor generator MG. In other words, motor generator MG is a three-phase permanent magnet motor and is configured such that one end of each phase coil winding of U, V, W phases is connected in common to a neutral point N. Furthermore, the other end of each phase coil winding is connected to the intermediate point of the switching elements of each phase arm 22, 24, 26.

In a step-up operation (voltage increasing operation), step-up/down converter 12 supplies DC voltage VH (which corresponds to an input voltage to inverter 20) produced by increasing DC voltage Vb supplied from DC power supply B to inverter 20. More specifically, in response to switching control signals S1, S2 from control circuit 50, the duty ratio (on-period ratio) of switching elements Q1, Q2 is set, so that the step-up ratio corresponds to the duty ratio.

On the other hand, in a step-down operation (voltage decreasing operation), step-up/down converter 12 charges DC power supply B by decreasing the DC voltage supplied from inverter 20 through smoothing capacitor C0. More specifically, in response to switching control signals S1, S2 from control circuit 50, a period during which only switching element Q1 is turned on and a period during which both switching elements Q1, Q2 are turned off are alternately provided, so that the step-down ratio corresponds to the duty ratio of the on-period described above.

Smoothing capacitor C0 smoothes DC voltage from step-up/down converter 12 and supplies the smoothed DC voltage to inverter 20. A voltage sensor 13 detects the voltage (namely, an inverter input voltage) between the opposite ends of smoothing capacitor C0 and outputs the detected value VH to control circuit 50.

When a torque command value of motor generator MG is positive (Tqcom>0), inverter 20 drives motor generator MG to output a positive torque by converting the DC voltage supplied from smoothing capacitor C0 into AC voltage by the switching operation of switching elements Q11-Q16 responsive to switching control signals S11-S16 from control circuit 50. In addition, when a torque command value of motor generator MG is zero (Tqcom=0), inverter 20 drives motor generator MG to attain a zero torque by converting DC voltage into AC voltage by the switching operation responsive to switching control signals S11-S16. Thus, motor generator MG is driven to generate a zero or positive torque designated by torque command value Tqcom.

In addition, at a time of regenerative braking of electric powered vehicle 100, torque command value Tqcom of motor generator MG is set negative (Tqcom<0). In this case, inverter 20 converts the AC voltage generated by motor generator MG into DC voltage and supplies the converted DC voltage (system voltage) to step-up/down converter 12 through smoothing capacitor C0, by the switching operation responsive to switching control signals S11-S16.

It is noted that the regenerative braking referred to herein includes braking involving regenerative power generation with a foot brake (brake pedal) operation by the driver of a hybrid vehicle or an electric vehicle, and decelerating (or stopping acceleration) the vehicle while regenerative power generation is performed by lifting off the accelerator pedal during travel without operating a foot brake. In other words, "a regenerative braking operation" of the electric powered vehicle in the present invention is defined to at least include a brake pedal operation by the driver or include both the brake pedal operation and the accelerator pedal off.

A current sensor 27 detects motor current MCRT flowing in motor generator MG and outputs the detected motor current to control circuit 50. It is noted that since the sum of instantaneous values of three phase current iu, iv, iw is zero, current sensor 27 may be arranged such that the motor current of only two phases (for example, V-phase current iv and W-phase current iw) is detected as shown in FIG. 1.

A rotational angle sensor (resolver) 28 detects a rotational angle θ of a not-shown rotor of motor generator MG and sends the detected rotational angle θ to control circuit 50. In control circuit 50, rotational speed Nmt (rotational angular speed ω) of motor generator MG can be calculated based on rotational angle θ.

In addition, motor generator MG is further provided with a temperature sensor 29. In general, temperature sensor 29 is provided to measure the temperature of the coil winding part where insulating coating destruction or the like may be caused by a temperature increase, and then output the measured temperature at least to control device 80. In the following, a temperature measured by temperature sensor 29 is called motor temperature Tmg.

Control device 80 receives battery information indicating the charge state and the input/output power limitation of DC power supply (battery) B and various vehicle sensor signals (for example, a sensor detection value indicating a vehicle state such as a vehicle speed or a road condition, and a sensor detection value indicating an operational state of a variety of equipment in the vehicle). Typically, a brake pedal 70 operated by the driver is provided with a depression force sensor 75, and depression force sensor 75 senses a brake depression force BK indicating a brake operation by the driver and transmits the same to control device 80.

A signal indicating a gradient GR of a road on which electric powered vehicle 100 travels is input from a gradient sensor 95 formed of a G sensor or the like to control device 80. Alternatively, control device 80 may receive altitude data of each point (the current location and the direction of travel) on a map from a navigation system 98 to sense or predict the gradient of a road. In other words, gradient sensor 95 and/or navigation system 98 corresponds to "gradient sensing portion" in the present invention.

Control device 80 generates torque command value Tqcom of motor generator MG and a regeneration instruction signal RGE based on the vehicle state, the accelerator/brake operation by the driver, and the like. It is noted that control device 80 generates torque command value Tqcom and regeneration instruction signal RGE in a range in which overcharging or overdischarging of DC power supply B does not occur, based on information concerning DC power supply B such as State of Charge (SOC) which is 100% at a time of full charge, inputtable electric power Pin indicating a charging limit, and outputtable electric power Pout indicating a discharging limit.

The control circuit for electric motor control (MG-ECU) 50 generates switching control signals S1, S2, S11-S16 controlling the operations of step-up/down converter 12 and inverter 20 so that motor generator MG outputs a torque according to torque command value Tqcom, based on torque command value Tqcom input from control device 80, battery voltage Vb detected by voltage sensor 10, system voltage VH detected by voltage sensor 13 and motor current MCRT from current sensor 27, and rotational angle θ from rotational angle sensor 28. In other words, control device 80 corresponds to an upper-level ECU of control circuit (MG-ECU) 50. It is noted that although in the example in FIG. 1, control circuit 50 and control device 80 are configured with separate ECUs, the functions of both of them may be integrated in a single ECU.

In this manner, in the configuration shown in FIG. 1, step-up/down converter 12, inverter 20 and control circuit 50 constitute "power conversion unit (PCU)" which performs bidirectional electric power conversion between DC power supply B and motor generator MG so that motor generator MG outputs a torque (positive torque, negative torque or zero torque) according to torque command value Tqcom.

At a time of step-up operation of step-up/down converter 12, control circuit 50 calculates a command value of system voltage VH depending on the operational state of motor generator MG and generates switching controls signals S1, S2, based on this command value and the detected value of system voltage VH by voltage sensor 13, so that output voltage VH attains a voltage command value.

Furthermore, when receiving control signal RGE indicating that electric powered vehicle 100 enters the regenerative braking mode from control device 80, control circuit 50 generates and outputs switching control signals S11-S16 to inverter 20 so that AC voltage generated in motor generator MG by the output of regenerative torque according to torque command value Tqcom is converted into DC voltage. Accordingly, inverter 20 converts regenerative electric power from motor generator MG into DC voltage, which is then supplied to step-up/down converter 12.

In addition, control circuit 50 generates and outputs switching control signals S1, S2 to step-up/down converter 12 in response to control signal RGE so that the DC voltage supplied from inverter 20 is decreased to the charging voltage of DC power supply B as necessary. In this manner, regenerative electric power from motor generator MG is used to charge DC power supply B.

In addition, control circuit 50 generates signal SE for turning on/off system relays SR1, SR2 and outputs the same to system relays SR1, SR2, at a time of start/stop of the driving system of electric powered vehicle 100.

Figure 2:
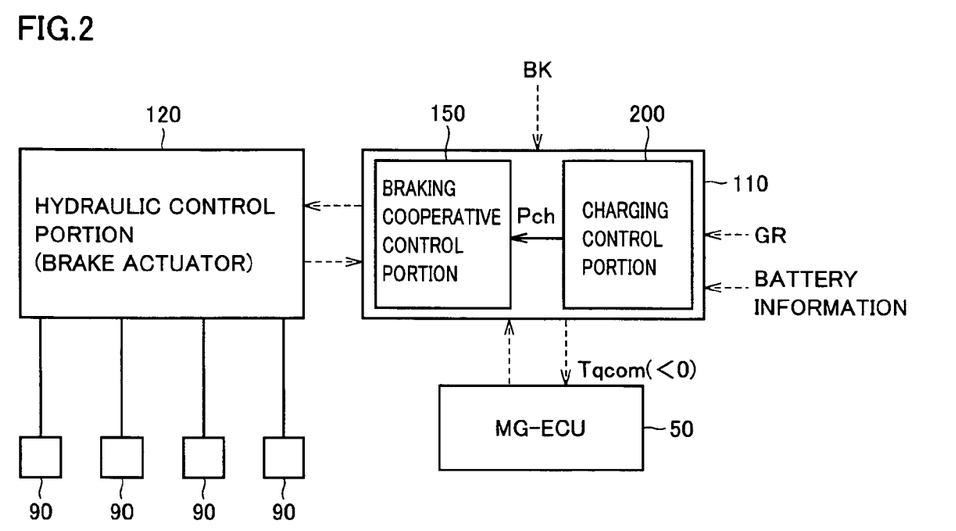
FIG. 2 is a schematic block diagram illustrating regenerative torque setting of a motor generator at a time of regenerative braking in the electric powered vehicle in accordance with the embodiment of the present invention.

FIG. 2 is a schematic block diagram illustrating regenerative torque setting of motor generator MG at a time of regenerative braking in the electric powered vehicle in accordance with the embodiment of the present invention.

Referring to FIG. 2, a regeneration control portion 110 for setting a torque command value of regenerative torque at a time of regenerative braking of the hybrid vehicle has a braking cooperative control portion 150 and a charging control portion 200.

Charging control portion 200 sets requested charging power Pch indicating electric power received by DC power supply B, based on battery information (SOC, Pin, and the like). Braking cooperative control portion 150 calculates a total barking force (power) required in the entire vehicle based on brake depression force BK of the driver and also controls the shares of the output of this total braking force between hydraulic brake 90 and motor generator MG.

Here, referring to FIG. 3 and FIGS. 4A-4D, an example of braking cooperative control will be described in a case where electric powered vehicle 100 is a hybrid vehicle.

Figure 3:
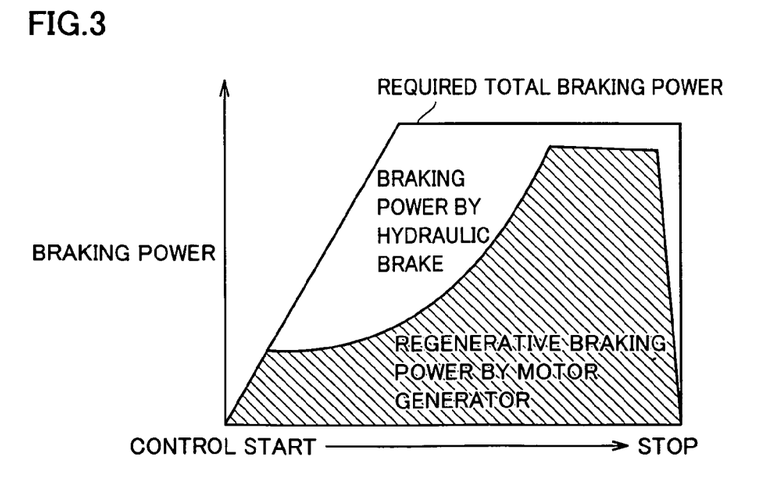
FIG. 3 is a conceptual diagram showing an example of braking cooperative control in a hybrid vehicle as an example of the electric powered vehicle in accordance with the embodiment of the present invention.

As shown in FIG. 3, in electric powered vehicle (hybrid vehicle) 100, the total braking force power is cooperatively secured by a combination of a mechanical braking force (power) generated by hydraulic brake 90 and an electrical braking force (power) generated as regenerative braking force (power) by the regenerative torque of motor generator MG. Thus, generation of charging power of DC power supply B recovered from the vehicle energy at a time of deceleration and securing of the braking force are set so as not to degrade the vehicle driving performance.

In FIGS. 4A-4D, an example of cooperative control of hydraulic braking and regenerative braking in each vehicle speed region in the hybrid vehicle is shown. As shown in FIG. 4A-4D in common, basically, a total braking power Pt requested in the entire vehicle increases proportionately with an increase of brake depression force BK.

Figure 4A:
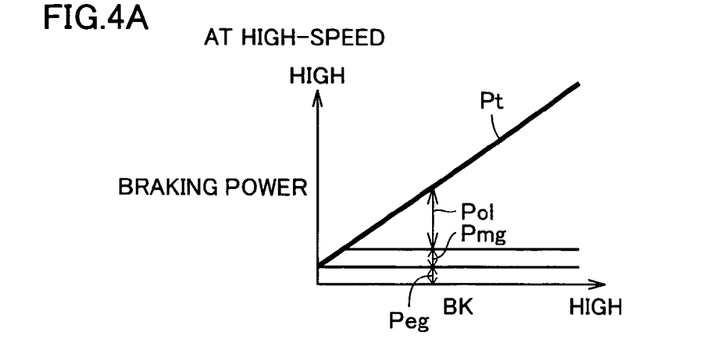
FIGS. 4A-4D are conceptual diagrams showing an example of cooperative control of hydraulic braking and regenerative braking at each vehicle speed in a hybrid vehicle.
Figure 4B:
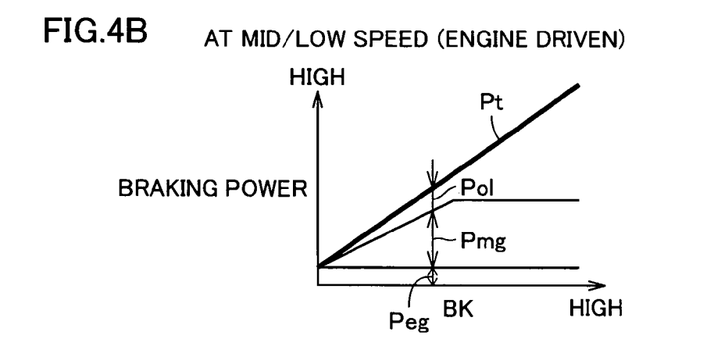

At the times of high-speed and low/mid-speed with the engine driven as shown in FIGS. 4A and 4B, total braking power Pt is secured by the sum of braking power Peg by engine braking, regenerative braking power Pmg by motor generator MG, and hydraulic braking power Pol generated by the hydraulic brake. Specifically, while braking power Peg by engine braking is secured constantly, regenerative braking power Pmg is increased to a prescribed level with the increasing braking depression force. Then, the shortage of the total braking power by engine braking and regenerative braking is made up for by hydraulic brake 90.

Figure 4C:
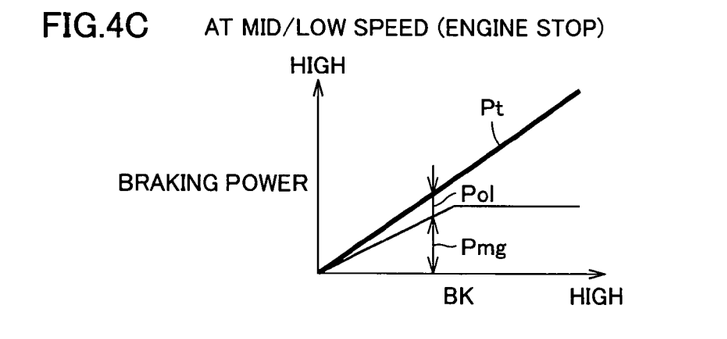
Figure 4D:
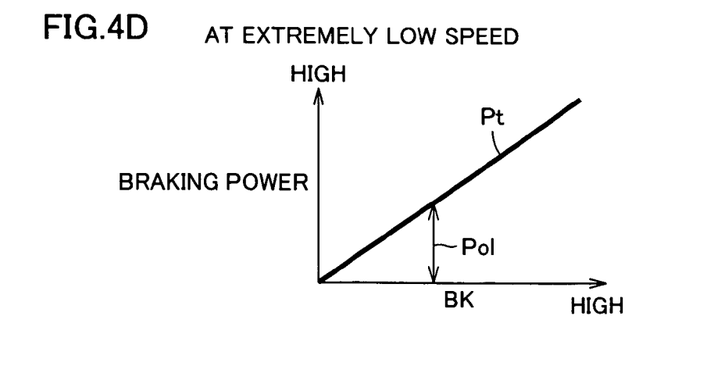

Furthermore, at the time of low/mid-speed with the engine stopped as shown in FIG. 4C, regenerative braking power Pmg is set similarly as in FIG. 4B, and in addition, the shortage of the total braking power by regenerative braking is made up for by hydraulic brake 90. In addition, at the time of extremely low-speed when the vehicle driving force is generated only by motor generator MG as shown in FIG. 4D, basically, the total braking power is secured only by hydraulic brake 90.

In FIGS. 4A-4D, when the brake depression force=0, the regenerative braking power Pmg=0. However, even when brake depression force=0, the vehicle may be decelerated or be stopped accelerating by generating a prescribed amount of regenerative braking power in an engine braking manner with the accelerator pedal off.

Referring to FIG. 2 again, regeneration control portion 110 sets regenerative torque command value Tqcom (generally, a negative value) so that regenerative power generation (regenerative braking) by motor generator MG at a time of regenerative braking is properly controlled. In particular, braking cooperative control portion 150 limits the regenerative electric power by regenerative braking within a range of requested charging power Pch set by charging control portion 200 or lower and determines the share of braking power (regenerative braking power) by motor generator MG. Regenerative control portion 110 sets torque command value Tqcom at a time of regenerative braking according to regenerative torque required for the output of the regenerative braking power. Torque command value Tqcom is transmitted to control circuit (MG-ECU) 50, and MG-ECU 50 controls the switching operation of converter 12 and inverter 20 so that motor generator MG generates regenerative torque according to torque command value Tqcom, in accordance with the control configuration illustrated in FIG. 1.

In addition, regeneration control portion 110 instructs a hydraulic control portion 120 of a hydraulic braking power requested for hydraulic brake 90, which corresponds to the difference between the total braking power and the regenerative braking power, so that the total braking power is secured in electric powered vehicle 100 as a whole. Hydraulic control portion 120 controls hydraulic pressure supply to each hydraulic brake 90 so that hydraulic brake 90 generates the requested hydraulic braking power. Then, each hydraulic brake 90 outputs a braking force according to the hydraulic pressure set by hydraulic control portion 120. It is noted that the braking force of hydraulic brake 90 provided for each wheel can be controlled independently as appropriate so that the comfortable vehicle traveling performance can be maintained at a time of deceleration.

Figure 5:
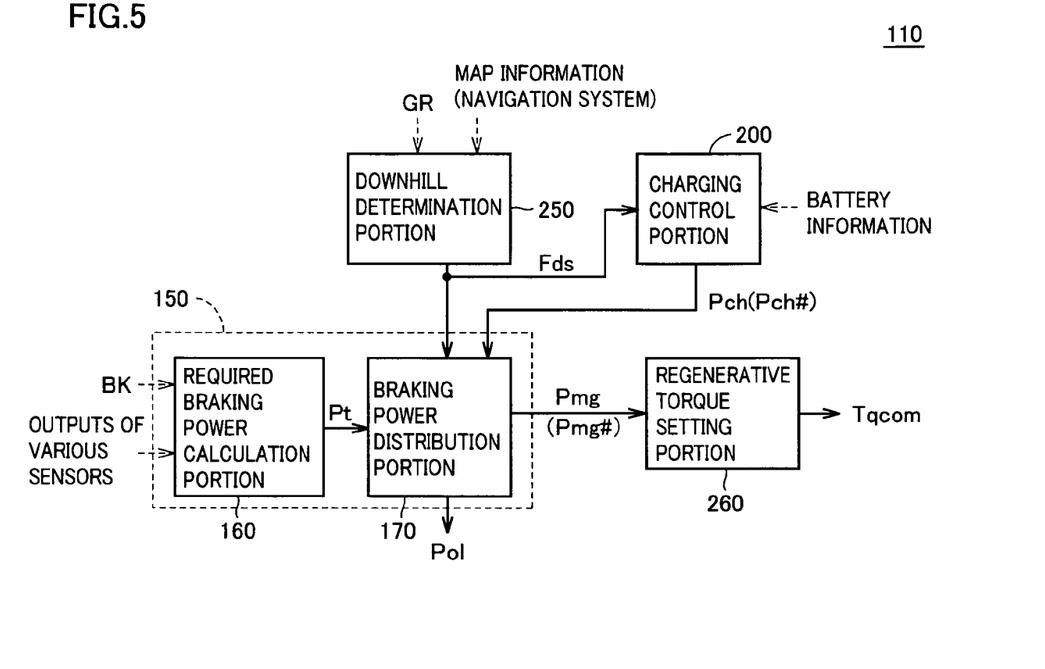
FIG. 5 is a block diagram illustrating a configuration of a regeneration control portion shown in FIG. 2 in more detail.

FIG. 5 is a block diagram showing the configuration of the regeneration control portion in accordance with the embodiment of the present invention in more detail. Each block shown in FIG. 5 is realized by software or hardware by control device 80.

Referring to FIG. 5, regeneration control portion 110 includes braking cooperative control portion 150, charging control portion 200, a downhill determination portion 250, and a regenerative torque setting portion 260.

Downhill determination portion 250 determines whether electric powered vehicle 100 is on downhill or not based on gradient GR of a road sensed by gradient sensor 95 and/or map information from navigation system 98. A downhill travel flag Fds indicating the determination result by downhill determination portion 250 is continuously turned on during downhill travel of electric powered vehicle 100 and is turned off in other cases.

Charging control portion 200 sets requested charging power Pch according to charging power that can be received by DC current supply B, according to battery information (SOC, Pin). It is noted that if DC power supply B is fully charged or in a high temperature state and charging is thus prohibited, Pch=0 is set.

Braking cooperative control portion 150 includes a required braking power calculation portion 160 and a braking power distribution portion 170. Required braking power calculation portion 160 calculates total braking power Pt required in the entire electric powered vehicle 100, based on outputs of various sensors indicating braking depression force BK and a vehicle speed and the like. Braking power distribution portion 170 sets regenerative braking power Pmg within a range of requested charging power Pch set by charging control portion 200 or lower, for example, in accordance with the cooperative control method according to a vehicle speed as illustrated in FIGS. 4A-4D, and also sets hydraulic braking power Pol in accordance with the remaining braking power (Pt−Pmg−Peg). As shown in FIG. 2, hydraulic pressure supply to each hydraulic brake 90 is controlled by hydraulic control portion 120 according to hydraulic braking power Pol, as shown in FIG. 2.

Here, braking power distribution portion 170 limits the regenerative braking power during the on of downhill travel flag Fds in comparison with during the off of downhill travel flag Fds, including at a time of flat-road travel. In other words, with the same total braking power Pt and vehicle condition (vehicle speed and the like) and so on, regenerative braking power Pmg# set during the on of downhill travel flag Fds is set at a value lower than regenerative braking power Pmg set during the off of downhill travel flag Fds (specifically, Pmg#<Pmg).

It is noted that regenerative braking power Pmg at a time of downhill travel can also be limited by charging control portion 200 by limiting the requested charging power during the on of downhill travel flag Fds in comparison with at a time of flat-road travel. In other words, charging control portion 200 is configured such that requested charging power Pch# set at a time of downhill travel is set at a value lower than requested charging power Pch in other cases including at a time of flat-road travel (specifically, Pch#<Pch), for the similar state (the same SOC or Pin) of DC power supply B, so that Pmg#=Pch# is set by braking power distribution portion 170. Therefore, regenerative braking power Pmg# set during the on of downhill travel flag Fds can be limited to a value lower than regenerative braking power Pmg set during the off of downhill travel flag Fds (Pmg#<Pmg).

Regenerative torque setting portion 260 sets torque command value Tqcom of motor generator MG according to regenerative braking power Pmg or Pmg# set by braking power distribution portion 170. Accordingly, the regenerative torque of motor generator MG is set so that the regenerative braking force corresponding to regenerative braking power Pmg or Pmg# is obtained. In other words, while the regenerative torque is set according to regenerative braking power Pmg# during the on of downhill travel flag Fds, regenerative torque Tqcom is set according to regenerative braking power Pmg during the off of downhill travel flag Fds.

It is noted that heat generation of motor generator MG at a time of downhill travel can be suppressed reliably by continuously prohibiting generation of regenerative torque at a time of downhill travel, namely, by setting regenerative braking power Pmg#=0.

Figure 6:
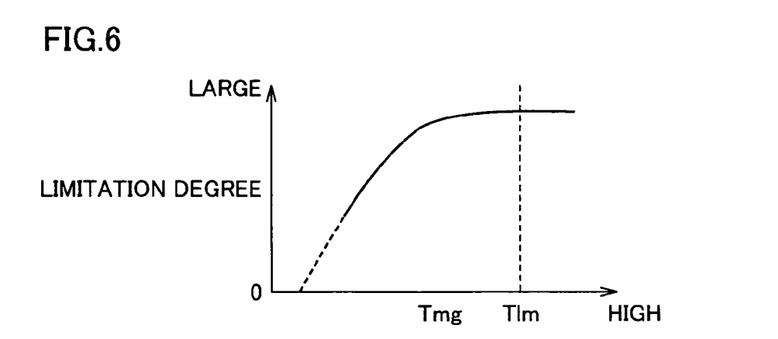
FIG. 6 is a conceptual diagram illustrating a setting example of a regenerative torque limiting degree with respect to a motor temperature.
Figure 7:
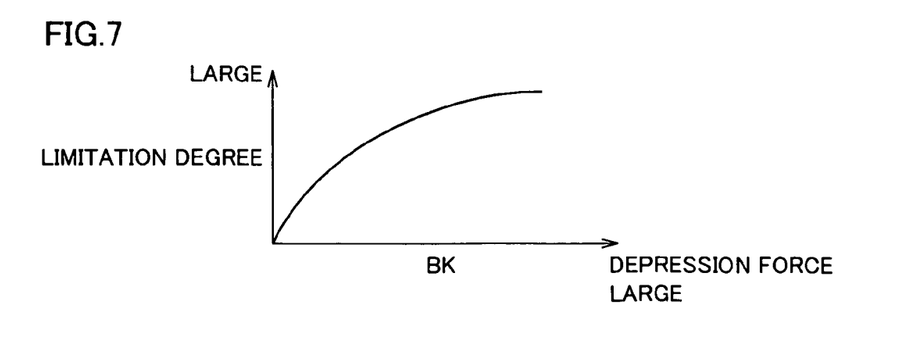
FIG. 7 is a conceptual diagram illustrating a setting example of a regenerative torque limiting degree with respect to a brake depression force.
Figure 8:
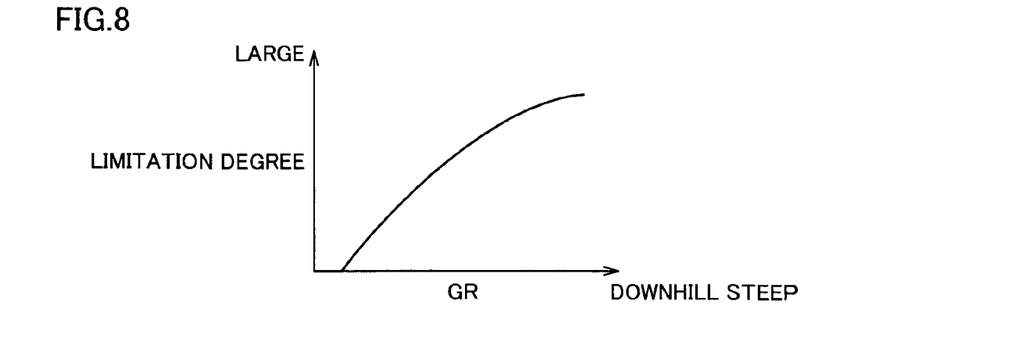
FIG. 8 is a conceptual diagram illustrating a setting example of a regenerative torque limiting degree with respect to a downhill gradient.

Alternatively, as shown in FIG. 6-FIG. 8, a limitation degree, of regenerative braking power (a limitation value of Pmg−Pmg#, or a limitation rate indicated by (Pmg−Pmg#)/ Pmg), that is, the limitation degree of regenerative torque at a time of downhill travel, may be set variably based on the conditions during downhill travel.

FIG. 6 shows a control example in which the limitation degree of regenerative torque is increased with the increase of motor temperature Tmg. In this case, regeneration is prohibited, that is, limited as Tqcom=0, by maximizing the limitation degree at least in motor temperature Tmg=Tlmt (temperature limit), preferably, at a temperature range lower than temperature limit Tlmt.

Furthermore, in a condition in which the regenerative braking power is highly requested and without limiting regenerative torque, a large regenerative torque is generated causing a temperature increase of motor generator MG, a temperature increase of motor generator MG can be suppressed by increasing the limitation degree of regenerative torque with the increasing brake depression force BK as shown in FIG. 7 or with the increasing road gradient (downhill) as shown in FIG. 8.

Figure 9:
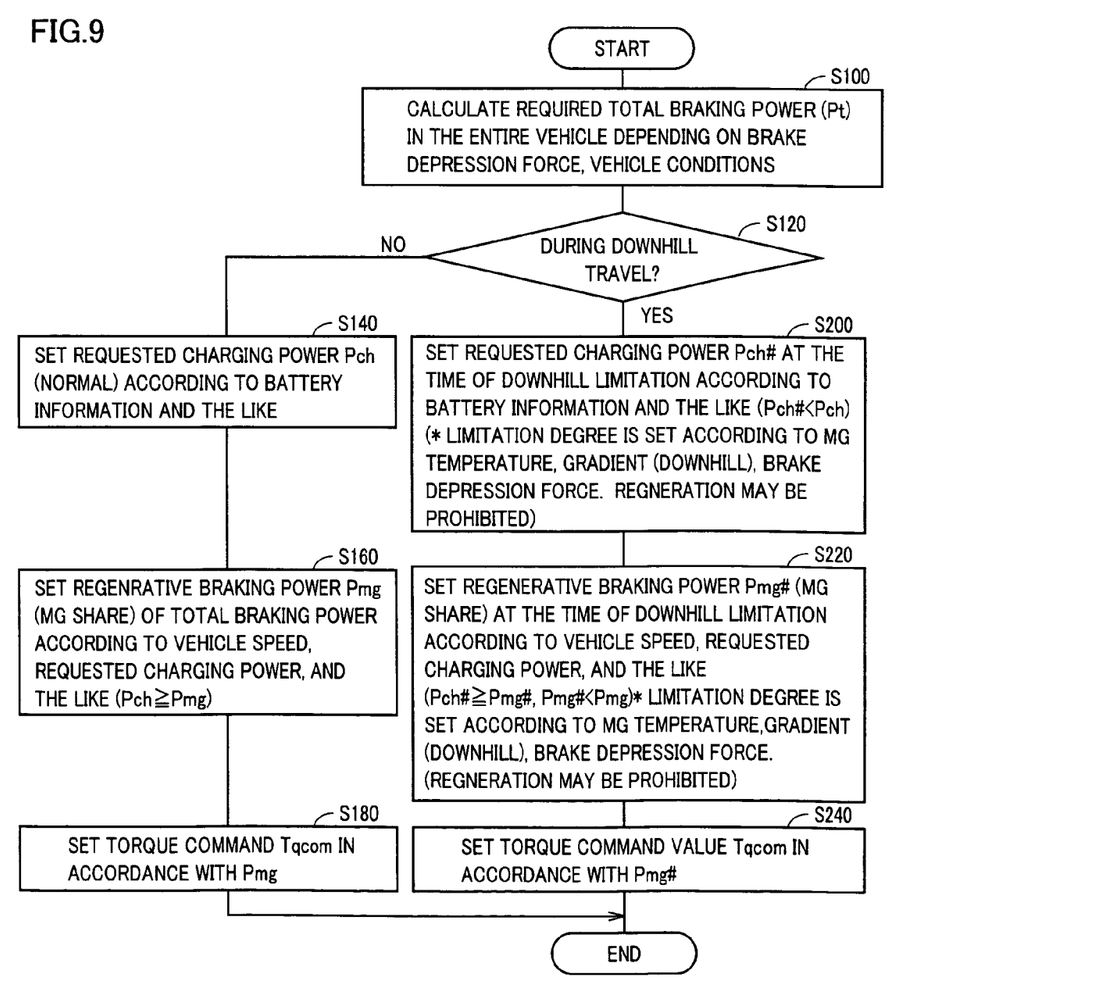
FIG. 9 is a flowchart showing a procedure of regenerative torque setting of a motor generator in the electric powered vehicle in accordance with the embodiment of the present invention.

FIG. 9 is a flowchart illustrating the procedure of regenerative torque setting of motor generator MG in the electric powered vehicle in accordance with the embodiment of the present invention. The control process procedure shown in FIG. 9 is realized, for example, by executing a program stored beforehand in control device (ECU) 80 at prescribed intervals.

Referring to FIG. 9, control device 80 calculates total braking power Pt required in the entire electric powered vehicle 100 based on the brake depression force, the vehicle conditions and the like, in step S100. Specifically, the processing in step S100 corresponds to the function of required braking power calculation portion 160 in FIG. 5.

Furthermore, control device 80 determines whether electric powered vehicle 100 is during downhill travel or not based on the output of gradient sensor 95 and/or map information from navigation system 98, in step S120. Specifically, the processing in step S120 corresponds to the function of downhill determination portion 250 shown in FIG. 5.

If not during downhill travel (if No in S120), control device 80 sets requested charging power Pch at normal times according to battery information or the like, in step S140, and sets regenerative braking power Pmg that is to be shared by motor generator MG, of total braking power Pt, according to a vehicle speed, requested charging power Pch, and the like, in step S160. Here, regenerative braking power Pmg is set within a range of Pmg<Pch. Then, control device 80 sets torque command value Tqcom (namely, the regenerative torque command) according to regenerative braking power Pmg set in step S160, in step S180.

On the other hand, during downhill travel (if YES in step S120), control device 80 sets requested charging power Pch# at the time of downhill limitation according to battery information and the like, in step S200. In other words, for the same battery information, requested charging power Pch# set in step S200 is lower than requested charging power Pch set in step S140 (Pch#<Pch).

In addition, control device 80 sets regenerative braking power Pmg# at the time of downhill limitation, according to a vehicle speed, requested charging power, and the like, in step S220. In other words, as for the regenerative braking power set under the same condition, regenerative braking power Pmg# set in step S220 is lower than regenerative braking power Pmg set in step S160 (Pmg#<Pmg).

Here, as illustrated in FIG. 6-FIG. 8, the limitation degree (limitation amount or limitation rate) of requested charging power and regenerative braking power is variably set according to the motor temperature, the downhill gradient, and the brake depression force. Alternatively, Pch#=0 may be set in order to avoid an increase of the motor temperature reliably by prohibiting generation of regenerative torque.

In addition, control device 80 sets torque command value Tqcom (regenerative torque command) according to regenerative braking power Pmg# set in step S220, in step S240.

Specifically, the processing in steps S140 and S200 corresponds to the function of charging control portion 200 shown in FIG. 5, the processing in step S160 and step S220 corresponds to the function of braking power distribution portion 170 shown in FIG. 5, and the processing in steps S180 and S240 corresponds to the function of regenerative torque setting portion 260 shown in FIG. 5. Here, even if the limitation of requested charging power in step S200 (Pch# is set in place of Pch) is not executed, the regenerative braking power at a time of downhill travel may be limited (Pmg# is set in place of Pmg) in step S200.

Figure 10:
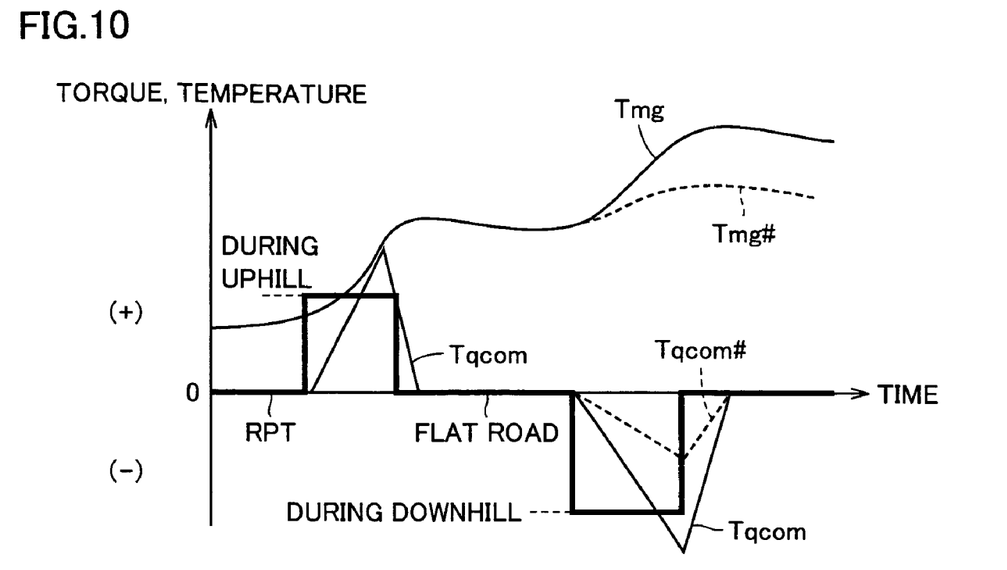
FIG. 10 is a waveform diagram showing an example of torque command value setting in the electric powered vehicle in accordance with the embodiment of the present invention.

FIG. 10 is a waveform diagram showing an example of torque command value setting in the electric powered vehicle in accordance with the embodiment of the present invention.

Referring to FIG. 10, in accordance with the travel pattern RPT in which flat-road travel—uphill travel—flat-road travel—downhill travel—flat-road travel are successively executed, torque command value Tqcom of motor generator MG is timely set. In the example in FIG. 10, for simplification of the explanation, the torque command value Tqcom=0 at a time of flat-road travel.

Torque command value Tqcom increases in the positive direction at a time of uphill travel to generate a vehicle driving force. Temperature Tmg of motor generator MG rises accordingly. Then, during downhill travel, according to the normal setting in which regenerative torque is set according to a brake operation, similarly as in flat-road travel, without provision of any particular limitation, torque command value Tqcom increases in the negative direction so that regenerative torque is output for generating regenerative braking force. Because of the following regenerative torque generation, motor temperature Tmg rises. At the end of downhill travel, torque command value Tqcom=0 is set again.

It is assumed that a toque output (positive direction) is additionally requested for uphill travel after downhill travel. In such a situation, due to a motor temperature Tmg increase at a time of downhill travel, motor temperature Tmg reaches the region in which torque limitation is required, so that power running torque cannot be generated enough, which may make it difficult to secure the vehicle driving force by motor generator MG. In such a circumstance, in a hybrid vehicle, engine drive in a low-efficiency region becomes necessary and fuel efficiency becomes poor. In an electric vehicle, it becomes difficult to secure a vehicle driving force.

Then, according to the regenerative torque setting in accordance with the embodiment of the present invention, torque command value Tqcom# during downhill travel is continuously limited so that the absolute value of the regenerative torque is smaller than at normal times, for a brake operation by the driver. Therefore, the increase of motor temperature Tmg# is gentler. As a result, a motor temperature increase at the end of downhill travel can be prevented, and in the following travel, such a circumstance can be prevented in that the torque limitation of motor generator MG makes it difficult to secure the vehicle driving force by motor generator MG.

In this way, in the electric powered vehicle in accordance with the embodiment of the present invention, an increase of motor temperature at a time of downhill travel can be suppressed by limiting or prohibiting (Tqcom#=0) an output of regenerative torque at a time of downhill travel. As a result, the output torque of motor generator MG in flat-road travel or uphill travel after the end of downhill travel is secured, thereby achieving the full motive power performance.

In addition, as for the limitation of regenerative torque at a time of downhill travel, the limitation degree is variably set according to the motor temperature, the downhill gradient, or the brake operation, so that the regenerative power generation at a time of downhill travel can be limited at an appropriate degree. As a result, while energy is recovered by regenerative power generation within a possible extent, a temperature increase of motor generator MG at a time of downhill travel can be prevented.

In particular, the regenerative power generation is designed to be focused on deceleration energy recovery at a time of flat-road travel, by suppressing or stopping regenerative power generation at a time of downhill travel in which the requested braking force by the driver's brake operation tends to increase and regenerative electric power is high, that is, a motor temperature increase is significant. Then, the specifications for suppressing a temperature increase of motor generator MG are relaxed. As a result, the size reduction can be achieved because of the simplified cooling structure of motor generator MG. Moreover, shifting to low gear in the entire vehicle for securing the traveling performance at a time of temperature increase can be avoided, so that fuel efficiency can be improved at a time of high-speed travel by shifting to high gear. In this manner, in the electric powered vehicle in accordance with the embodiment of the present invention, the specification design related to motor generator MG can be made efficient.

It is noted that the application of the prevent invention is not limited only to hybrid vehicles and electric vehicles, and the present invention is applicable in common to an electric powered vehicle equipped with a motor generator configured to generate a vehicle driving force by generation of power running torque and to perform regenerative power generation by generation of regenerative torque.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric powered vehicle comprising:
   a motor generator configured to be able to receive/transmit a rotational force from/to a wheel;
   a power conversion unit configured to perform bidirectional electric power conversion between a chargeable power supply and said motor generator so that said motor generator outputs a torque according to a torque command value;
   a gradient sensing portion sensing a gradient of a road; and
   a regeneration control portion configured to generate the torque command value of said motor generator in a regenerative braking operation, at least according to a brake operation by a driver,
   wherein said regeneration control portion sets said torque command value of said motor generator to approximately zero at a time of downhill travel, based on a road gradient sensed by said gradient sensing portion.

2. The electric powered vehicle according to claim 1,
   said regeneration control portion including:
   a braking cooperative control portion calculating a requested braking power in the entire vehicle according to a state of said electric powered vehicle and said brake operation and also setting a regenerative braking power shared by said motor generator, of the requested braking power, and
   a regenerative torque setting portion generating the torque command value in said regenerative braking operation according to said regenerative braking power set by said braking cooperative control portion,
   wherein said braking cooperative control portion sets said regenerative braking power to approximately zero at a time of said downhill travel, based on said road gradient.

3. The electric powered vehicle according to claim 2,
   said regeneration control portion further including a charging control portion setting a requested charging power of said power supply according to a charge state of said power supply, wherein
   said braking cooperative control portion sets said regenerative braking power within a range of said requested charging power or lower, and
   said charging control portion sets said requested charging power to approximately zero at a time of said downhill travel, based on said road gradient.

\* \* \* \* \*